June 14, 1949. J. C. KASS 2,472,905
TRACTOR HITCH
Filed June 18, 1945 2 Sheets-Sheet 1

WITNESS:
Lennie L. Parker

INVENTOR.
JOHN C. KASS
BY Rice and Rice
ATTORNEYS

June 14, 1949.  J. C. KASS  2,472,905
TRACTOR HITCH

Filed June 18, 1945  2 Sheets-Sheet 2

INVENTOR.
JOHN C. KASS
BY Rice and Rice
ATTORNEYS

Patented June 14, 1949

2,472,905

UNITED STATES PATENT OFFICE 2,472,905

TRACTOR HITCH

John C. Kass, Ravenna, Mich.

Application June 18, 1945, Serial No. 600,151

5 Claims. (Cl. 280—33.44)

The present invention relates to a tractor hitch and more particularly to a swinging draw bar therefor.

The primary objects of the instant invention are to provide a tractor hitch of the general character above indicated which when fixed to a tractor is particularly well adapted for efficiently towing a farm implement such as disc harrow, cultivator, mower, harvester, or the like; to provide such a tractor hitch whose towed implement follows the lead of the tractor when the tractor is turned as in turning a corner or turning the tractor about; to provide such a tractor hitch which is rugged and sturdy in construction; to provide such a tractor hitch to which the towed implement may be readily and conveniently detachably secured; and, to provide such a tractor hitch which is reasonably economical in manufacture.

Conventional tractor hitches in common use are less efficient than the hitch herein shown and described in that when the tractor is turned, the towed implement tends to turn in the opposite direction rather than following the tractor which is of course desirable. It is thus the primary object of the present invention to provide a tractor hitch to which the towed implement is detachably secured and which will follow the turning movement of the tractor.

An illustrative embodiment of the invention is shown in the accompanying drawings, wherein.

Figure 1:
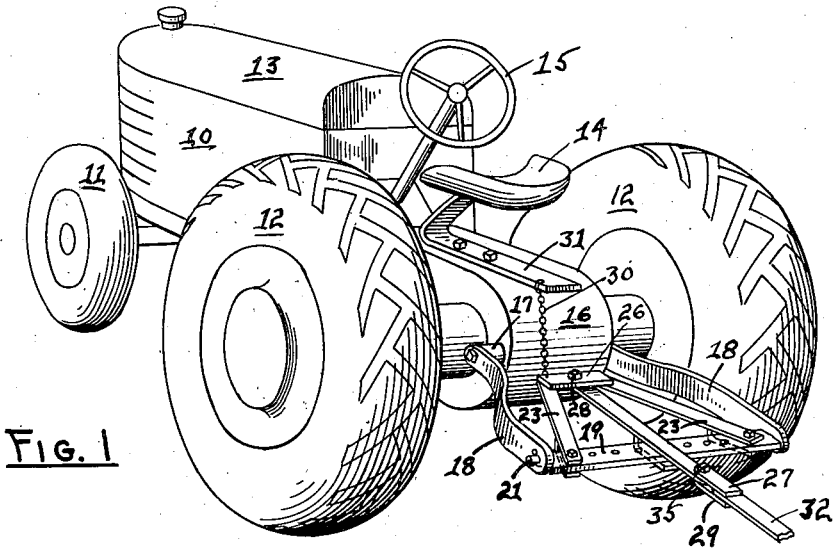
Figure 1 is a perspective view of a conventional type tractor to which is secured the novel form of tractor hitch or swinging draw bar.
Figure 2:
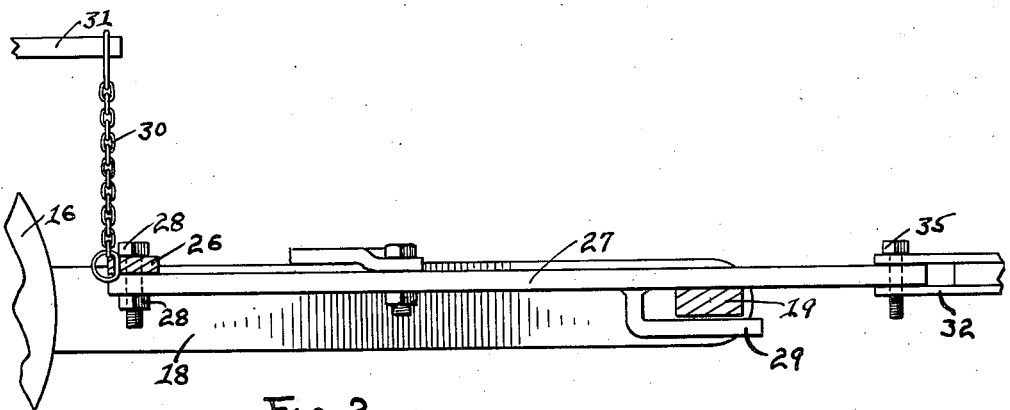
Figure 2 is a sectional view of the tractor hitch on line 2—2 of Figure 4.
Figure 3:
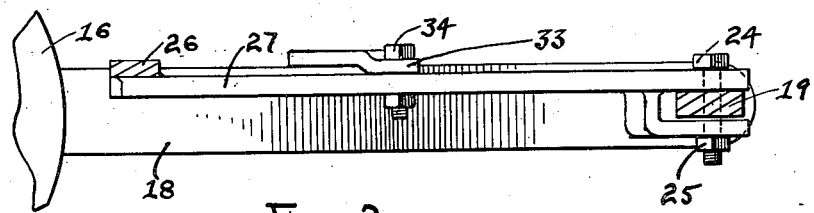
Figure 3 is a sectional view of the tractor hitch on line 3—3 of Figure 4.

Referring then to the drawings wherein like parts of the tractor and its hitch are designated by the same numerals in the several views, a tractor generally designated 10 is provided with conventional front wheels 11, rear driving wheels 12, motor hood 13, seat 14, steering wheel 15 and differential housing 16.

The opposite sides of the differential housing are here shown as each provided with a laterally projecting axially aligned stub 17 to the end of each of which is pivotally connected a rearwardly outwardly bowed springable arm 18, and a cross bar 19 is rotatably connected interjacent the the outer ends of the arms 18 in any suitable manner as by trunnions 21 and securing cotter pins 22 whereby the movement of the draw bar 27 is better accommodated in the travel of the tractor and its trailer over rolling fields. The above described arrangement of arms 18 and cross bar 19 is conventional in presently known tractors.

The hitch attachment of my invention comprises a pair of radius bars 23, each secured at its outer end adjacent an outer end of the cross bar 19 as by a threaded bolt 24 projecting through an aperture 20 and its nut 25, converge inwardly toward each other and its inner ends are each secured adjacent the outer ends of a shorter bar 26 as by spot welding. Each radius bar 23 is preferably provided with a depending yoke portion 50 secured to its under surface and which bears against the under surface of the cross bar 19.

A draw bar 27 pivotally connected to the bar 26 intermediate its ends as by the threaded bolt 28 and its nut extends rearwardly above and past the cross bar 19 and a depending yoke portion 29 secured to the under surface of the draw bar as by spot welding, bears against the under surface thereof.

Figure 4:
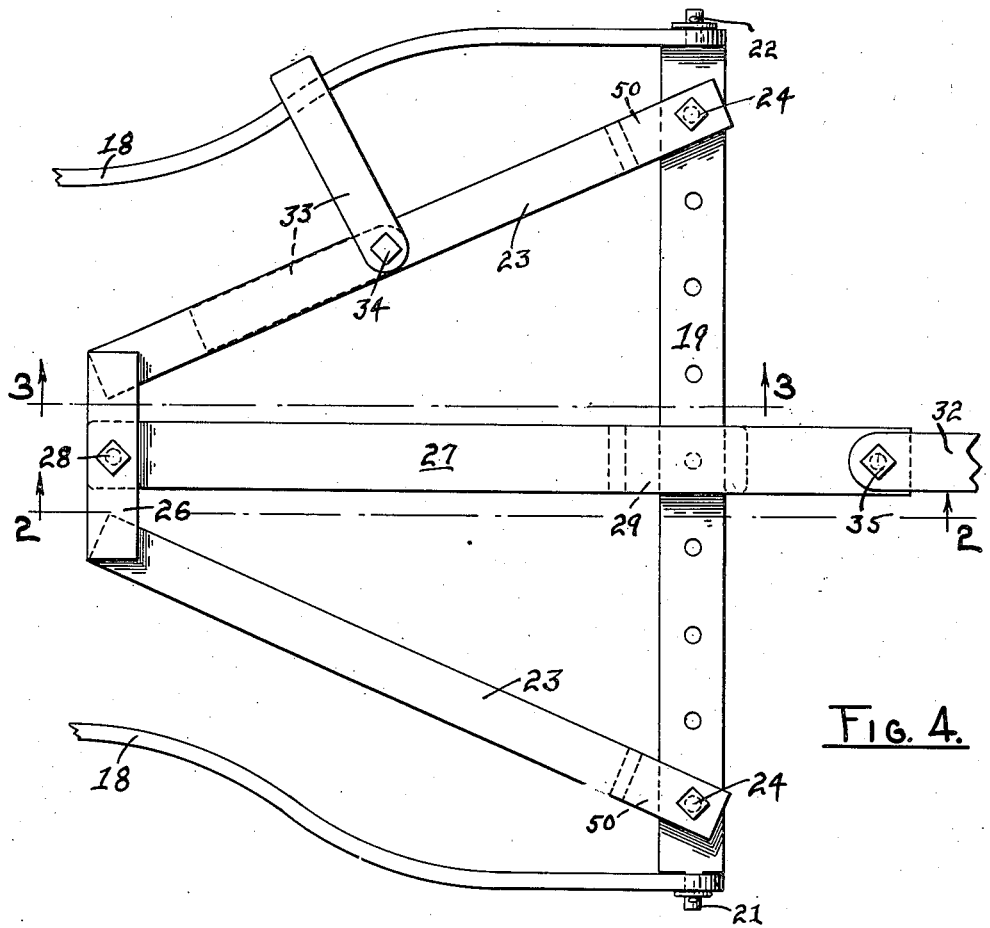
Figure 4 is a top plan view of the tractor hitch per se, a portion of each end of its securing arms being broken away.
Figure 5:
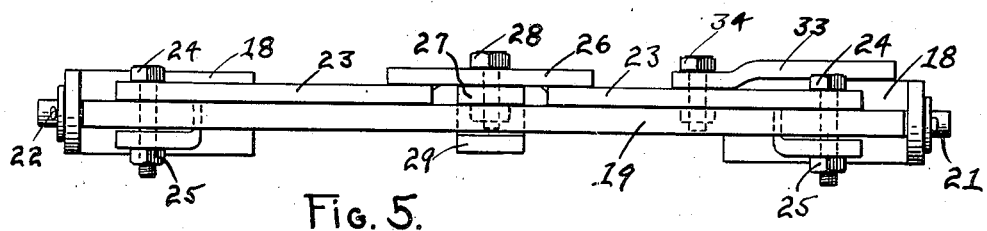
Figure 5 is a rear end elevational view of the tractor hitch.

A chain 30 detachably secured at end to the end of the seat support 31 is connected at its other end to the bar 26 to prevent the pivotally mounted hitch from dropping when the tongue 32 of the towed implement, not shown, is pivotally secured as by the bolt 35 to the outer end of the draw bar 27 and a laterally projecting arm 33 secured medially of the length of one radius bar 23 as by a bolt and nut 34 overhangs and bears against the upper edge of one arm 18 for optionally preventing the dropping of the pivotally supported hitch as best shown in Figures 4 and 5.

Operation

In operation, the tongue 32 of a farm implement such as a disc harrow, cultivator, mower, harvester or the like is secured to the draw bar 27 by means of the threaded bolt 35, the other end of which draw bar is pivotally connected to the cross bar 26 by means of the threaded bolt 28. Thus, since the draw bar 27 is pivotally connected to the cross bars 26 fixedly secured at its outer ends to the radius bars 23 which in turn are fixedly secured at their other ends to the cross bar 19, the towed implement follows the lead of the tractor when the tractor is turned, as in turning a corner or turning the tractor about rather than "fighting" its way around the turn.

Furthermore, the tractor hitch elevates or drops depending upon the rolling character of the terrain as the implement is drawn thereover, making for more efficient operation thereof because of the pivotal connections herein illustrated and described.

It will thus be seen that the tractor hitch herein illustrated and described provides for the towing of an implement which follows the lead of the tractor when turning a corner or turning about, and while but one specific embodiment of the invention has been herein shown and described, it will be understood that certain details of the construction shown may be altered or omitted without departing from the spirit of the invention as the same is defined by the following claims.

I claim:

1. A tractor hitch comprising a pair of spaced arms, each adapted to be secured to a tractor at one end of each; a cross bar rotatably secured between the opposite ends of the arms; a pair of radius bars disposed between the arms fixedly secured together adjacent one of their respective ends and spacedly fixedly secured adjacent their opposite ends to the cross bar; and a draw bar pivotally secured to and between the radius bars.

2. A tractor hitch comprising a pair of spaced arms, each adapted to be pivotally secured to a tractor at one end of each; a cross bar rotatably secured between the opposite ends of the arms; a pair of radius bars disposed between the arms fixedly secured together adjacent one of their respective ends and spacedly fixedly secured adjacent their opposite ends to the cross bar; and a draw bar pivotally secured to and between the radius bars.

3. A tractor hitch attachment for a tractor having a pair of spaced arms secured at one end of each to the tractor, and a cross bar rotatably secured between the opposite ends of the arms, said attachment comprising a pair of radius bars adapted to be disposed between said arms and being fixedly secured together adjacent one of their respective ends, means for spacedly fixedly securing said arms adjacent their opposite ends to said cross bar, and a draw bar pivotally secured to and between the radius bars.

4. A tractor hitch attachment for a tractor having a pair of spaced arms pivotally secured at one end of each to the tractor, and a cross bar rotatably secured between the opposite ends of the arms, said attachment comprising a pair of radius bars adapted to be disposed between said arms and being fixedly secured together adjacent one of their respective ends, means for spacedly fixedly securing said arms adjacent their opposite ends to said cross bar, and a draw bar pivotally secured to and between said radius bars.

5. A tractor hitch attachment for a tractor having a pair of spaced arms secured at one end of each to the tractor, and a cross bar rotatably secured between the opposite ends of the arms, said attachment comprising a pair of radius bars adapted to be disposed between said arms and being fixedly secured together adjacent one of their respective ends, means for spacedly fixedly securing said arms adjacent their opposite ends to said cross bar; a draw bar pivotally secured to and between said radius bars, and means on said draw bar adapted to cooperate said cross bar for preventing vertical movement of said draw bar away from said cross bar in the various lateral portions of the draw bar with respect to the cross bar.

JOHN C. KASS.

REFERENCES CITED

The following references are of record in the file of this patent:

UNITED STATES PATENTS

| Number | Name | Date |
| --- | --- | --- |
| 1,678,114 | Gustafson | July 24, 1928 |
| 1,759,063 | Paul | May 20, 1930 |
| 2,341,807 | Olmstead et al. | Feb. 15, 1944 |